United States Patent [19]

Deeg et al.

[11] 4,036,623
[45] July 19, 1977

[54] METHOD OF MAKING HARDENED OPHTHALMIC LENSES BY ION EXCHANGE

[75] Inventors: Emil W. Deeg, Woodstock, Conn.; Richard D. Courtemanche, Southbridge, Mass.

[73] Assignee: American Optical Corporation, Southbridge, Mass.

[21] Appl. No.: 611,383

[22] Filed: Sept. 8, 1975

Related U.S. Application Data

[63] Continuation of Ser. No. 390,742, Aug. 23, 1973, abandoned, which is a continuation of Ser. No. 157,481, June 28, 1971, abandoned.

[51] Int. Cl.² ............................................. C03C 15/00
[52] U.S. Cl. ................................. 65/30 E; 106/47 Q
[58] Field of Search .................... 65/30 E; 106/47 Q

[56] References Cited

U.S. PATENT DOCUMENTS

| | | | |
|---|---|---|---|
| 3,287,200 | 11/1966 | Hess et al. | 65/30 E |
| 3,445,316 | 5/1969 | Megles | 65/30 E |
| 3,615,323 | 10/1971 | Cornelissen et al. | 65/30 E |
| 3,661,545 | 5/1972 | Bartholomew | 65/30 E |
| 3,687,649 | 8/1972 | Bourgeaux | 65/30 E |
| 3,751,238 | 8/1973 | Grego et al. | 65/30 E |
| 3,954,487 | 5/1976 | Gliemeroth et al. | 65/30 E |

OTHER PUBLICATIONS

"Glass: The Miracle Maker", by C. J. Phillips Pitman Pub. Corp., New York,, 1943, pp. 97-100.

*Primary Examiner*—S. Leon Bashore
*Assistant Examiner*—Frank W. Mign
*Attorney, Agent, or Firm*—William C. Nealon; H. R. Berkenstock, Jr.

[57] ABSTRACT

Ophthalmic lenses formed of ophthalmic glass and having accurately finished front and back curved surfaces and edged to the shapes desired are heated in molten salt bath and ion-exchange hardened on all surfaces thereof so as to satisfy high safety standards while being substantially free from optical image distortions for objects viewed therethrough. The invention includes method and apparatus for rapid and controlled preheating, soaking and cooling steps of lenses relatively cheaply and in sizable numbers at the same time.

3 Claims, 4 Drawing Figures

METHOD OF MAKING HARDENED OPHTHALMIC LENSES BY ION EXCHANGE

This application is a continuation of application Ser. No. 390,742, filed Aug. 23, 1973. This application is now abandoned. Application Ser. No. 390,742 is in turn a continuation of application Ser. No. 157,481, filed June 28, 1971, now abandoned.

This invention relates to improved ophthalmic lenses, sunglass lenses and the like and method and apparatus for hardening of same and more particularly to such lenses which, after having been ground and polished to the accurate curvatures desired, such as for the predetermined Rx prescription values required for different individuals or for no-power sunglasses or safety glasses and then suitably edged to the particular lens shape desired for frame mounting purposes have been treated carefully but rapidly and in sizable numbers simultaneously to render same highly impact- and shock-resistant.

More specifically, the invention pertains to eyeglass lenses of the clear types formed of ophthalmic crown glasses, and which lenses after being suitably ground, polished and edged, are then treated by a carefully controlled heating, ion-exchange surface-hardening and cooling process which treats each and every exposed surface area of the lenses so as to render same highly impact- and shock-resistant.

Furthermore, the process is such that the hardened and impact-resistance conditions desired are effected in the treated lenses comparatively rapidly and in sizable numbers and without, in any way, introducing any significant amount of distortion in the finished lenses. This is so even though such lenses include all lenses of an ordinary ophthalmic lens series and which may vary greatly in shape, size and thickness, including a wide range of positive and negative dioptric values (from +20.00D to −20.00D) for corrective eye care purposes and even no-power lenses, safety glasses and the like. In fact, the lenses which may be so treated may include both single vision lenses and multifocal lenses, and as to multifocal lenses may be ones formed of a single piece of glass or of the bifocal and trifocal types wherein same are primarily formed of an ophthalmic crown glass but additionally have, in usual fashion, bifocal or trifocal segments of higher refractive index glass inserted therein. Even lenses for aphakic and cataract patients can be so treated.

Heretofore, ophthalmic lenses which were 3.0mm thick and which have been hardened to be impact-resistant by heating of the lenses to a controlled temperature and thereafter quickly chilled by jets of air simultaneously directed towards opposite sides of the lenses have provided surface-hardened lenses of good quality. Lenses of this type which will withstand a U.S.A. standard Z-87.1-1968 drop-ball test (1.0 inch steel ball weighing 2.35 ounces dropped freely onto the outer surface of a lens from a height of 50 inches without fracture of the lens) may be designated in the trade as "safety lenses". In many manufacturing areas at the present time, the use of such safety lens is mandatory. While some of such air-jet cooled hardened lenses have no power and are for use as safety lenses, others may contain different individual's prescriptive corrections, either positive or negative, and may vary greatly in dioptric values.

A drop-ball test for use in considering hardened lenses for ordinary uses, that is, lenses which are not to be subjected to the severe conditions of use expected for safety lenses, is the drop-ball test proposed by the Z-80 Committee of the American National Standards Institute and hereinafter referred to as the Z-80 drop-ball test. This test consists of a ⅝ inch stainless steel ball weighing 0.56 ounces dropped freely onto the outer surface of a lens likewise from a height of 50 inches. (There are other requirements for this test but same are not set forth here.) Of course, lenses of this more conventional type do not need to be of the 3.0mm thickness mentioned above for safety lenses. A standard minimum thickness might be taken as 2.0mm.

In the production of such air-jet hardened or tempered lenses, there are a fair number of no-power lenses which, for every 100 lenses produced and treated, will not pass the standard drop-ball test. Furthermore, when positive or negative prescriptive powers are provided in the lenses to care for different individual's requirements, the number of lenses for every hundred lenses, which will not pass due to internal strains and breakage seems to increase, and even increases at a greater rate for strongly negative lenses than for the positive lenses. In fact, in lenses of strong corrective powers, particularly lenses of negative powers, distortions which may be so introduced into the otherwise finished lenses can be so great as to materially distort the already built-in correction intended for an individual. Additionally, other conventional forms of lenses which have been air-jet hardened such as bifocal lenses having built-in reading segments of higher index glass and bifocal lenses of the one-piece type having steps or ledge-like portions extending entirely across the lenses between the near and distant vision portions thereof may fail more frequently to pass the standard drop-ball test than other types of lenses due possibly to greater strains and stresses developing near such inserts or stepped portions.

On the other hand, the improved finished lenses of the present invention may be formed of ophthalmic crown glass and having suitable amounts of sodium therein for effecting an ion-exchange conditioning or hardening of all exposed surface areas thereof and with fewer failures during the testing than heretofore whether these lenses be of a no-power safety type or no-power colored coated sunglass type or of a corrective prescriptive type involving positive and negative dioptric powers of any conventional values and of single and multifocal types without introducing into the lenses so finished, edged and hardened any significant amount of distortion.

The improved hardened ophthalmic crown glass lenses of the present invention show no birefringence in any part thereof even when inspected at a 50X magnification and no birefringent cross (such as would be observed in an air-jet hardened lens) is visible when viewed through a conventional polariscope. All treated surfaces of the lens are non-crystalline in character and uniform in appearance from edge-to-edge thereof. This is not the case in air-jet quenched lenses. On the other hand, when the improved lens is strongly illuminated with white light directed normal to one of its main (front or back) surfaces, it does show a faint whitish ring near its outer edge when the lens is viewed through an edge thereof. Or, if a different color of light is used as the illumination, the ring near the outer edge of the lens will be of such color. No such a condition will be observed if an air-jet lens is so illuminated. Another condition observed in the improved lens in comparison with an air-hardened lens or even an ordinary annealed lens is that the ion-exchange treated lens exhibits slightly more surface reflectivity. This is due to a higher refractive index of the ion-exchanged surface layer.

It is, accordingly, an object of the present invention to provide an ophthalmic lens formed in the main of an ophthalmic crown glass and having good light-transmission properties in at least a preselected wavelength region within the visible spectrum and with said lens having an ion-exchange hardened condition at all exposed surface portions of the lens and with said lens including front and back finished related curved surfaces providing any conventional positive or negative dioptric value desired and without having any significant distortion introduced into any part of the hardened lens, such being the case even though said lens may be of a single or multifocal type including conventional reading segments of higher refractive index glass embedded therein or of the one-piece stepped bifocal or trifocal type.

A better understanding of the invention will be had by reference to the detailed description which follows when taken in conjunction with the accompanying drawings wherein.

Figure 1:
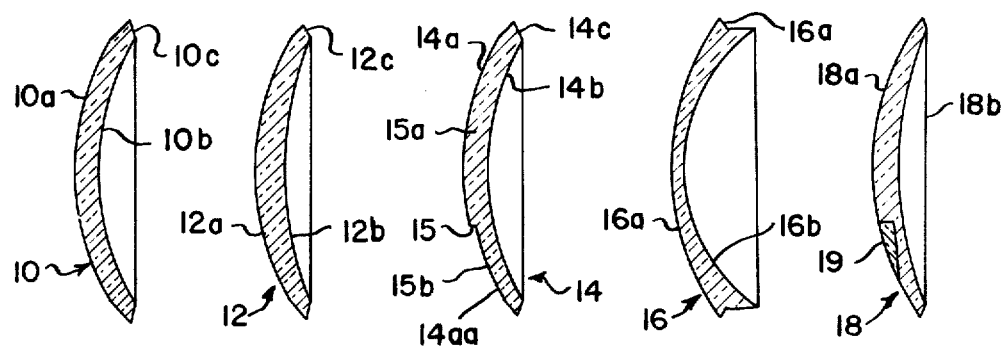
FIG. 1 is a diagrammatic showing of several different ophthalmic lenses in side-by-side relation to each other, each being shown in vertical section in order to display different details of construction thereof.

Referring to the drawings in detail and in particular to FIG. 1, it will be seen that ophthalmic lenses of materially different kinds are shown in side-by-side relation, and in cross-section, at 10, 12, 14, 16 and 18. Nevertheless, each of these, after grinding, polishing and edging, may be advantageously treated without difficulty by the ion-exchange process of the present invention and will provide materially improved results; that is, substantially all lenses so treated passed the impact test. On the other hand, heretofore when lenses of these different types were hardened by a conventional cold air-jet hardening process, as referred to above, some of these different types of lenses experienced appreciable numbers of lenses which did not withstand the impact test when applied thereto.

Lens 10, it will be noted, is provided with front and back spherically curved surfaces 10a and 10b which are in substantially parallel relation to each other. Accordingly, these surfaces provide no increase or decrease in dioptric power for light transmitted therethrough when in use. As shown, lens 10 is fairly thick and, accordingly, when hardened by the ion-exchange process might very well be intended for use as a safety lens. Or such a lens of lesser thickness, and with desired light-absorbing properties, could be used as a sunglass lens. This lens has been circumferentially edged, as indicated at 10c, to the shape desired for mounting purposes before being hardened. Lenses 12 and 16, however, are somewhat different in that the former is a corrective lens of fairly strong positive power employing convexly and concavely curved surfaces 12a and 12b, of different curvatures on the opposite sides thereof, and the latter lens is a corrective lens of fairly strong negative power provided by front and rear curved surfaces 16a and 16b. While the lens 12 can be readily edged, as indicated at 12c, to the desired shape since its outer edge is not too thick at any part thereof, on the other hand, negative lens 16, even though it is provided with a fairly thin portion near its center, nevertheless, is fairly thick near its outer edge, as shown in 16c. This is so even though the outer thick edge of the lens has been reduced somewhat by circumferentially beveling the lens near the front surface of the lens for mounting purposes.

Lens 14, on the other hand, is a multifocal lens formed of a single piece of glass but having a step or shoulder 15 extending horizontally across the lens and providing not only a distance viewing portion 15a in the upper part thereof but also a reading portion 15b in the lower part thereof. The distance portion of this lens is formed by curved rear surfaces 14b and upper curved front surface 14a, and the reading portion of the lens below line 15 is formed by a stronger curved surface 14aa in cooperation with the curved rear surface 14b. Lens 14 is edged at 14c for mounting purposes before hardening.

Referring to bifocal lens 18, it will be seen that front surface 18a and rear surface 18b cooperate in providing a lens with positive correction. However, in a lower area of the front surface of this lens is provided a reading segment 19 which is formed of higher index glass inserted into the lens in known manner. This segment is ordinarily formed of a high index glass, such as flint glass, and provides a stronger dioptric power through the segmented portion of the lens than other parts thereof for reading purposes and the like. In air-jet hardened bifocal lenses of the types indicated at 14 and 18 heretofore failures have occurred during the testing of the lenses, and in the case of lenses of the type of lens 14 may possibly be due to some area of weakness near the stepped part thereof, while, on the other hand, failures in the case of lenses of the type of lens 18 may possibly be due to stresses and strains in the two kinds of glass used in areas near the junctions of the segments with the glass of the remaining parts of the lenses.

All of the lenses disclosed in FIG. 1 may be hardened by the ion-exchange process of the present invention and provide lenses which are highly impact- and shock-resistant and substantially free from distortion even though different parts of the lens differ greatly in thickness, and all areas of the lenses will be so hardened.

Heretofore when lenses of the above types were treated by a carefully controlled heating process and then rapidly cooled on both sides simultaneously by air-jet blasts, not all lenses provided the hardened conditions desired and, at the same time, were free from distortions. Probably one type of the lens which experienced more difficulty than others in providing the hardened conditions desired was the strong negative lens, such as indicated at 16 of FIG. 1. By the rapid cooling of the outside of the lens, a compression was effected therein and the interior of the lens was, at the same time, placed in tension. However, due to the large quantity of glass near the outer parts of this negative lens and the rather thin section near the optical center, distortions insofar as the optical prescriptive properties of the lens were concerned were appreciable, and even failure of such lenses at times could occur. Likewise, in a single piece lens of the type shown at 14 in FIG. 1, wherein two definitely different portions of the lens (near and far) existed, different undesirable stresses and birefringent conditions within the lens were apt to result.

It has now been found that if lenses formed of glasses within the following range of oxide contents are employed, such lenses, even though substantially all different values of an ophthalmic lens series from +20.00D to −20.00D, with or without varying amounts of cylindrical powers from 0 to +4.00D, may be treated by the process of the present invention and will provide a high degree of satisfactory lenses which are free from distortions and will withstand the Standard Z-80 test, or even provide conditions superior thereto.

| GLASS COMPOSITION RANGE In Weight Percent Oxide Content | | | |
|---|---|---|---|
| | | Fining Agents Which Can Be Used | |
| $SiO_2$ | 60–75 | | |
| | | $Sb_2O_3$ | 0–2 |
| $Na_2O$ | 5–10 | | |
| | | $CeO_2$ | 0–4.5 |
| $K_2O$ | 5–10 | | |
| | | $As_2O_3$ | 0–1.5 |
| CaO | 7–15 | | |
| LiO | 0–5 | | |
| MgO | 0–2 | | |
| ZnO | 2–8 | | |
| $Al_2O_3$ | 0–7 | | |
| $ZrO_2$ | 0–2 | | |
| $TiO_2$ | 0–2 | | |

A specific example of an optical glass which has provided highly satisfactory results when treated by the ion-exchange process of the present invention is an ophthalmic crown glass having the following oxide content given in weight percent values:

$SiO_2$: 68.40
$Na_2O$: 8.60
$K_2O$: 7.80
CaO: 8.50
MgO: 0.14
ZnO: 2.90
$Al_2O_3$: 2.20
$TiO_2$: 0.40
$As_2O_3$: 0.16
$Sb_2O_3$: 0.90

This glass has a refractive index of 1.523 and a dispersion factor of 58.1. Additionally, its coefficient of expansion is $93.10^{-7}$ per degrees C, its strain point T 14.5 is 500° C or 932° F and its softening point T 7.6 is 731° C or 1348° F. "Strain point" has a recognized meaning in the art. See for example, the discussion on pages 99 and 100 of the book "GLASS: The Miracle Maker" by C. J. Phillips. See also the British Pat. No. 917,388 to Kistler, published Feb. 6, 1963 entitled "A Method of Treating Glass to Increase the Tensile Strength Thereof and Glass So Treated."

When a lens having a composition falling within the above range of values is treated by the ion-exchange process of the present invention, the lenses are initially pre-heated at a rate of approximately 20° F. per minute until a temperature of approximately 670° F. is reached. At such times, the lenses are submerged in a molten bath of potassium nitrate which has been heated to a liquid state in a furnace which is at a furnace temperature of approximately 750° F. Actually, for best treatment conditions and for a treatment period of 4 hours, the temperature within liquid potassium nitrate bath should be above the decomposition temperature of the potassium nitrate, preferably between approximately 850° and 870° F. since decomposition does not begin in any sizable amount until temperatures above 752° F. are reached. The lenses so immersed in the liquid salt bath are treated for a period of approximately 4 hours and then removed. After they are cooled at a controlled rate of approximately 40° per minute until a temperature of approximately 150° F. is reached. They are then rinsed in warm water and wiped clean of all foreign matter.

Broader working ranges for treatment of the lenses would include a treatment period of from 2 to 65 hours and a treatment temperature ranging from 760° to 960° F. While this latter temperature is above the 932° F. strain point or strain temperature for ophthalmic crown glass, nevertheless, it is well below the softening point for this glass which is at approximately 1348° F. It is even possible to use temperatures above 960° F and in some cases as high as 1300° F. wherein strong positive lenses are being considered since no distortion will appear therein. By so doing, one gains the advantage of a shorter exchange period, and even a period as short as 1 hour may be feasible.

No distortion or warpage in lenses, even strongly negative lenses, which have been surface-treated in the above manner, to replace the sodium ions at the surfaces of the glass by potassium ions, occurs. Each lens is then tested by the Standard Z-80 test for impact.

Figure 2:
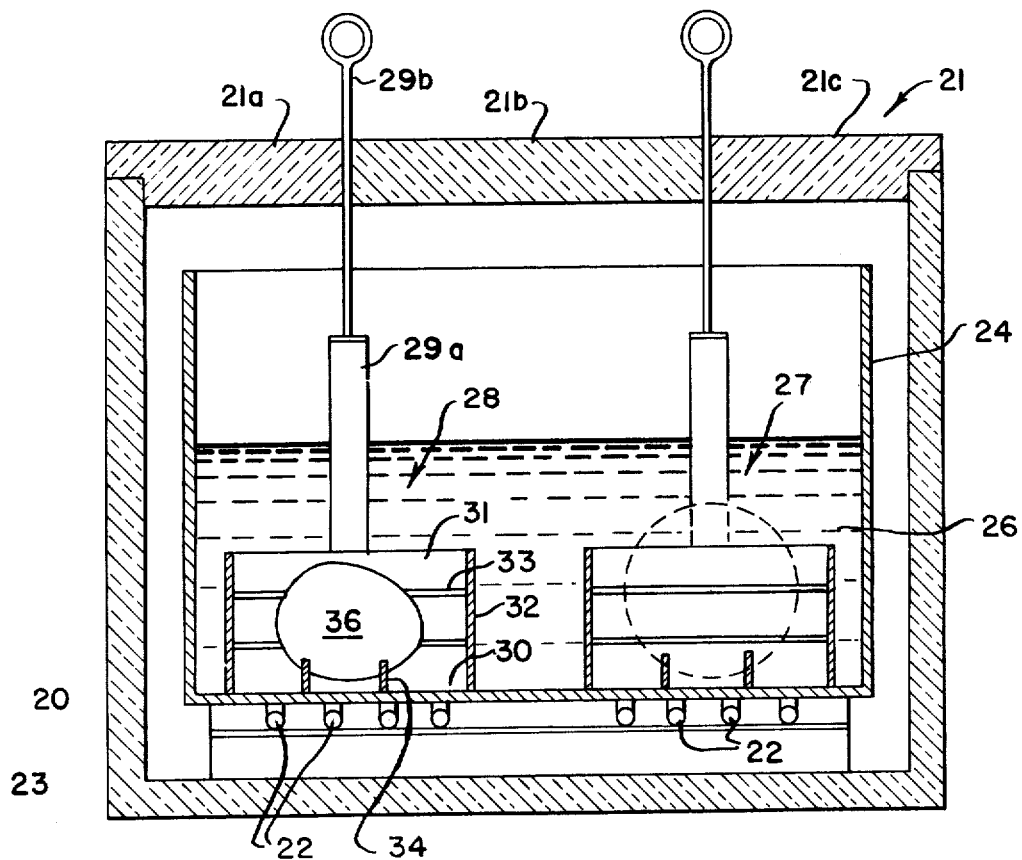
FIG. 2 is a vertical cross-sectional view of a heating and treating chamber and associated equipment employed therewith for carrying out the invention.

In FIG. 2 is shown a heating chamber 20 formed of any usual refractory material and has heating coils 22 therein. As shown, they are carried upon a supporting base 23 of suitable material. Within the chamber is provided a stainless steel tank 24 for containing the liquid salt bath into which the lenses to be treated are to be submerged. The bath is indicated at 26. A cover 21 closes the furnace and for convenience may be provided in two, three or more sections as indicated at 21a, 21b and 21c. When these sections are removed, it is an easy matter to place a tray, such as indicated at 27 or 28, which has a bail 29a, a long arm 29b for lifting purposes, in the tank in the molten bath of salt solution therein. Each tray is in the form of an elongated rectangular box having an open bottom 30 and end and side walls 31 and 32 arranged to carry a plurality of supporting cross bars 33 and a pair of longitudinal bars 24, so that as many as a dozen or more shaped and edged lenses 36 may be positioned within each trough at one time and be retained in spaced relation to each other while being processed in the bath. In fact, the arrangement is such that each lens has a minimum of surface contact with its support means while soaking in the bath.

As stated above, the temperature of the potassium nitrate bath would be approximately 870° F. and the lenses would be retained in the bath for approximately 4 hours while the ion-exchange process of replacement of sodium ions by potassium ions takes place. As indicated in the Chart of FIG. 3, lenses which have been submerged in such a hot bath and treated for different temperatures and for different amounts of time, such as 2, 4, 6, 15, 19, 24 and 63 hours and thereafter tested by the drop ball test are indicated.

Since in the ophthalmic manufacture of lenses as here involved, each lens to be hardened is otherwise a finished edged lens providing the specific requirements of an individual, it is important that, on the one hand, a satisfactory treatment of each lens be accomplished and, on the other hand, that no more time than necessary be involved in the treatment.

Figure 3:
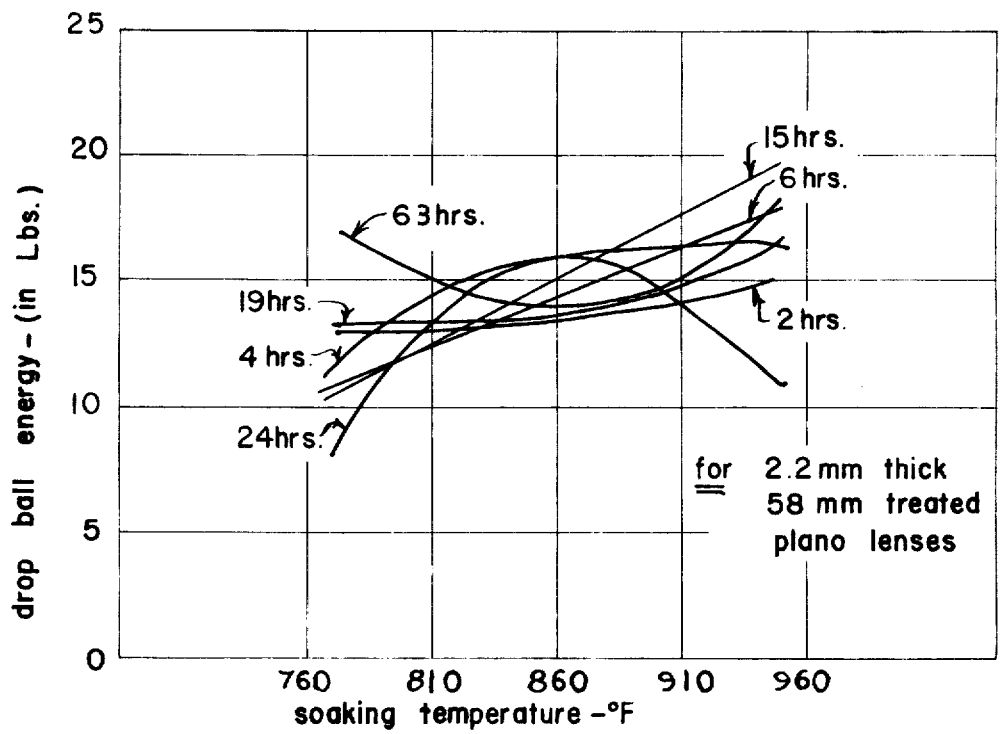
FIG. 3 is a graph showing relations between treatment temperatures for lenses and drop-ball energies at failure for lenses which have been treated for different predetermined extended periods of time.

By use of charts of the type of FIG. 3, it has been possible to determine that satisfactory results in treating of the lenses can be accomplished in approximately 2 to 63 hours of ion-exchange processing when the treatment temperature is between 760° and 960° F. However, when waiting individuals are involved, it has been determined that substantially no more than a four-hour treatment of the lenses is preferred since such will provide satisfactory results.

The surface condition of the treated lens is such that only a skin-like thickness of the lens is effected but, nevertheless, all surfaces, corners and the like are so treated. Notwithstanding, the conditions resulting from such a treatment of the lenses provide lenses which have a strength dispersion and abrasion-resistance noticeably better than that to be expected normally from thermally treated and hardened lenses. Furthermore, no distortion is present.

In the following TABLE "A" is shown in three different columns numbered 1, 2 and 3 series of lenses ranging from +5.00D to −15.00D which have been ion-exchange treated, heat-treated and annealed, respectively, and tested under comparable conditions to show the differing results which were obtained when subjected to the Z-80 impact test:

Lenses in column 1, on the other hand, wherein same have been ion-exchange treated in accordance with the present invention have shown a 100% passage when subjected to the Z-80 impact test for all lenses of values between +5.00D and −10.00D power. Not until the −15.00D lenses were tested did the percentage drop down to 88%.

TABLE "B" below shows results of group of lenses of different dioptric power (D.) of the ion-exchanged type (I.E.) and the heat-treated type (H.T.) which were treated under differing conditions as to ball diameters (Dia.) until the point of minimum impact energy (MIE) at fracture (in Ft. Lbs.) for any lens was reached and average impact energy (AIE) at fracture for all lenses tested (in Ft. Lbs.) was reached:

TABLE "B"

| | I.E. | | H.T. | | I.E. | | H.T. | |
|---|---|---|---|---|---|---|---|---|
| D. | MIE | Dia. | MIE | Dia. | AIE | Dia. | AIE | Dia. |
| +5 | (>5.52) | 1¼" | — | — | (>5.52) | 1¼" | — | — |
| +3 | (>5.52) | 1¼ | .46 | 1" | (>5.52 | 1¼" | 1.00 | 1" |
| +1 | 1.43 | 1¼ | .13 | 25/32 | 1.71 | 1¼ | .24 | 25/32 |
| 0 | — | — | .10 | 5/8 | — | — | .30 | 5/8 |
| −1 | .92 | 1 | .13 | 25/32 | 1.30 | 1 | .28 | 25/32 |
| −3 | 1.06 | 1 | .23 | 1¼ | 1.45 | 1¼ | .62 | 1¼ |
| −5 | .87 | 1 | .16 | 5/8 | .98 | 1 | .24 | 5/8 |
| −8 | 1.44 | 1¼ | — | — | 1.48 | 1¼ | — | — |

The impact resistance tests were performed on 48 FV7 ophthalmic crown lenses supported by a plastic tube 1 inch I.D. and 1¼ inch O.D. with a ⅛ by ⅛ neoprene gasket on the top edge. A steel ball of sufficient weight to break the lens was selected (ball size is given in Table) and the impact energy of that ball was varied by varying the height from which it was dropped onto

TABLE "A"

| LENS POWERS | #1 ION EXCHANGE | #2 HEAT TREATED | #3 ANNEALED |
|---|---|---|---|
| Single Vision Lenses | % Passing Z-80 Test | % Passing Z-80 Test | % Passing Z-80 Test |
| +5.00 | 100 | | |
| +3.00 | 100 | 100 | 57 |
| +1.00 | 100 | 91 | 0 |
| 0.00 | 100 | 88 | 11 |
| −1.00 | 100 | 97 | 2 |
| −3.00 | 100 | 95 | 49 |
| −5.00 | 100 | 93 | 2 |
| −8.00 | 100 | 60 | 0 |
| −10.00 | 100 | | 0 |
| −15.00 | 88 | | |
| Bifocal Lenses | | | |
| One-piece −2.00 +2.50 add | 100 | 54 | 0 |
| One-piece −4.00 +2.00 add | 96 | 42 | 0 |
| One-piece −6.00 +2.00 add | 80 | 28 | 4 |
| One-piece +4.00 +2.00 add | 92 | 100 | 30 |

In column 3 of TABLE A, it will be seen that, while annealed lenses of a +3.00 dioptric value have had 57% passed the test, nevertheless, other annealed lenses of the series, for example −8.00D and −10.00D, have failed completely to pass the Z-80 test. Similarly, in column 2 are shown the results of heat-treated and hardened lenses of like values when subjected to the Z-80 impact test. In this column, it will be seen that, while 100% of the lenses of +3.00 Dioptric power have withstood the impact test, nevertheless, only about 91% and 88% of the lenses of +1.00D power and of zero power have passed. When strongly negative power lenses are considered, such as −8.00D lenses, the percentage which passed the test dropped down to only 60%. Furthermore, in such treated lenses, at times, a measurable amount of distortion for images viewed through the lens was present.

the geometric center of the lens. Each test was performed on a set of 25 samples. No exact impact energy values are reported for ion-exchanged lenses of powers +3D and +5D due to fracture of the supporting plastic tube of ball energies of approximately 5.52 ft. lbs. The difference in impact resistance between ion-exchanged and air-quenched lenses becomes even more obvious if the actual impact resistance is measured. TABLE "B" contains such information. All ion-exchanged lenses in this TABLE are at least four times stronger under impact of the dropped ball than the corresponding air-quenched lenses.

Figure 4:
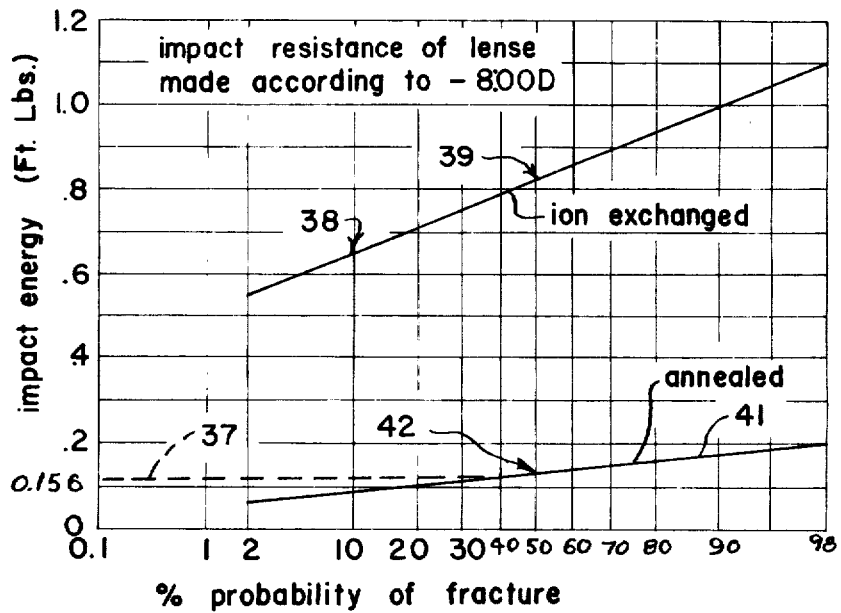
FIG. 4 is a chart showing impact-resistance for groups of lenses hardened by the ion-exchange treatment in comparison with conventionally annealed lenses.

In FIG. 4 is shown a Probability of Fracture chart or Graph for use in comparing the impact-resistance of a plurality of ion-exchange treated lenses processed in the manner of the present invention with a plurality of lenses which have been annealed in the conventional manner. In the vertical direction on the chart a uniform scale of numerical values for Impact Energy (in Ft. Lbs.) has been indicated and in the horizontal direction a standard Cumulative Frequency Percent Scale is shown.

Subsequent to the treatment and controlled cooling and cleaning of the improved lenses (in the present case −8.00D) lenses were subjected to the standard Z-80 impact test. A dotted line 37 at 0.156 on the Impact Energy Scale indicates the impact level for this test. None of the treated lenses failed the test. Thereafter, the height from which the ⅝ inch diameter steel ball was dropped was gradually increased and the test reported until each lens eventually fractured. The so-determined impact resistance-failure point for each ion-exchange treated lens expressed in terms of foot pounds of energy is shown in FIG. 4 by curve 38 and wherein arrow 39 indicates a point of intersection of this curve with the vertical line marked 50 as the ultimate energy level at which approximately 50 percent of the treated lenses will fail. A somewhat similar curve 41 for conventional annealed lenses is also shown on the chart and its 50% point is indicated by arrow 42. Thus, it can be readily appreciated from this chart not only that all of the treated lenses passed the Z-80 test but, additionally, that all were so improved by the ion-exchange treatment process that they could be expected to absorb three or more times this amount of energy without fracturing.

Having described our invention, we claim:

1. An ion replacement method for strengthening an ophthalmic crown type of glass wherein the oxide weight percent content of said glass consists essentially of oxides falling within the limits defined by the following table:

$SiO_2$: 60–75
$Na_2O$: 5–10
$K_2O$: 5–10
CaO: 7–15
LiO: 0–5
MgO: 0–2
ZnO: 2–8
$Al_2O_3$: 0–7
$ZrO_2$: 0–2
$TiO_2$: 0–2
$Sb_2O_3$: 0–2
$CeO_2$: 0–4.5
$As_2O_3$: 0–1.5 to enable said glass when suitably supported for drop-ball test purposes to withstand without fracture the impact produced by a ⅝ steel ball dropped freely from a height of 50 inches onto the outer face of the glass near the center thereof, said method consisting essentially of subjecting said glass to a heat treatment period, said treatment period consisting of an initial preheating to a temperature sufficiently high to prevent damage to said glass when it is subsequently placed in a heated potassium nitrate salt bath, said salt bath being at a temperature above the strain point of said glass, submersing said heated glass in a liquid bath of potassium nitrate having a soaking temperature above the strain point of the glass for a time of from approximately 2 to 63 hours, withdrawing said glass article from said bath and lowering the temperature of the glass article.

2. A method according to claim 1 wherein said heat treatment period of the bath is in the range of from 960° to 1300° F.

3. A method according to claim 1 wherein the oxide weight percent content of said glass consists essentially of the oxides defined by the following table:

$SiO_2$: 68.40
$Na_2O$: 8.60
$K_2O$: 7.80
CaO: 8.50
MgO: 0.14
ZnO: 2.90
$Al_2O_3$: 2.20
$TiO_2$: 0.40
$As_2O_3$: 0.16
$Sb_2O_3$: 0.90

* * * * *